United States Patent [19]

Sommer et al.

[11] 4,230,826
[45] Oct. 28, 1980

[54] ORGANOPOLYSILOXANE COMPOSITIONS AND ELASTOMERS FORMED THEREFROM

[75] Inventors: Oswin Sommer, Burghausen; August Schiller, Marktl; Norman Dorsch; Alois Strasser, both of Burghausen, all of Fed. Rep. of Germany

[73] Assignee: Wacker-Chemie GmbH, Munich, Fed. Rep. of Germany

[21] Appl. No.: 33,280

[22] Filed: Apr. 25, 1979

[30] Foreign Application Priority Data

May 26, 1978 [DE] Fed. Rep. of Germany ....... 2823011

[51] Int. Cl.$^3$ ...................... C08L 83/06; C08L 33/20
[52] U.S. Cl. .................................. 525/100; 525/101; 525/102; 525/104
[58] Field of Search ................ 260/827; 525/100, 101

[56] References Cited

U.S. PATENT DOCUMENTS

| 3,294,709 | 12/1966 | Nitzsche et al. ...................... 260/827 |
| 3,497,570 | 2/1970 | Yerrick ................. 260/827 |
| 3,678,003 | 7/1972 | Kaiser et al. .......... 260/827 |
| 3,711,570 | 1/1973 | Lewis .................. 260/827 |

Primary Examiner—Wilbert J. Briggs, Sr.

[57] ABSTRACT

Compositions which are stable when stored under anhydrous conditions, but when exposed to atmospheric moisture cross-link to form elastomers comprising (1) an organopolysiloxane having terminal condensable groups, (2) a silicon compound having at least 3 Si-bonded hydrolyzable groups per molecule and (3) from 30 to 100 percent by weight, based on the weight of the organopolysiloxane (1), of a powder obtained from the homopolymerization or copolymerization of an acrylonitrile in an aqueous medium.

5 Claims, No Drawings

ORGANOPOLYSILOXANE COMPOSITIONS AND ELASTOMERS FORMED THEREFROM

The present invention relates to organopolysiloxane compositions and more particularly to room temperature curable organopolysiloxane compositions containing a powder obtained from the polymerization of acrylonitrile in an aqueous medium.

BACKGROUND OF INVENTION

Organopolysiloxane compositions which are stable under anhydrous conditions, but cross-link to form elastomers at room temperature when exposed to atmospheric moisture are well known. Compositions which contain organopolysiloxanes having terminal condensable groups, a silicon compound as a cross-linking agent having at least 3 Si-bonded hydrolyzable groups per molecule and containing polyvinylchloride powder are described in U.S. Pat. No. 3,711,570 to Lewis. In comparison to the compositions described in U.S. Pat. No. 3,711,570, the compositions of this invention form elastomers which exhibit greatly improved adhesion to wood, including untreated wood as well as wood which has been painted or glazed.

Organopolysiloxane compositions which contain from 1 to 15 percent by weight of polyacrylonitrile based on the weight of the organopolysiloxane to improve the thermal stability of the organopolysiloxane compositions are also described in U.S. Pat. No. 3,497,570 to Yerrick.

Therefore, it is an object of this invention to provide organopolysiloxane compositions having non-slump properties. Another object of this invention is to provide room temperature curable organopolysiloxane compositions which exhibit improved adhesive characteristics. A further object of this invention is to provide room temperature curable compositions which will adhere to unprimed substrates.

SUMMARY OF INVENTION

The foregoing objects and others which will become apparent from the following description are accomplished in accordance with this invention, generally speaking, by providing a composition containing (1) an organopolysiloxane having terminal condensable groups, (2) a silicon compound containing at least 3 Si-bonded hydrolyzable groups per molecule and (3) from 30 to 100 percent by weight based on the weight of the organopolysiloxane (1) of a powder obtained from the homopolymerization or copolymerization of an acrylonitrile in an aqueous medium. The composition is stable when stored under anhydrous conditions, but when exposed to moisture, cross-links to form an elastomer.

DETAILED DESCRIPTION OF INVENTION

The same organopolysiloxanes containing terminal condensable groups which could have been used heretofore in the preparation of compositions which can be stored under anhydrous conditions, but cross-link when exposed to moisture at room temperature with a silicon compound having at least 3 Si-bonded hydrolyzable groups to form elastomers may be used in this invention.

The organopolysiloxanes containing terminal condensable groups which are generally used in the preparation of such compositions and which are preferred for this invention, are diorganopolysiloxanes of the general formula:

$$HO(SiR_2O)_xSiR_2OH,$$

wherein R represents the same or different, monovalent or substituted monovalent hydrocarbon radicals having from 1 to 18 carbon atoms and x represents an integer with a value of at least 10.

Although this is generally not shown in formulas such as illustrated above, siloxane units other than the diorganosiloxane units ($SiR_2O$) may be present within or along the siloxane chains of the above formula. Examples of such other siloxane units which are generally present, but only as impurities, are those having the formulas $RSiO_{3/2}$, $R_3SiO_{\frac{1}{2}}$ and $SiO_{4/2}$, where R is the same as above. Nevertheless, it is preferred that siloxane units other than diorganosiloxane units be less than about 10 mol percent and more preferably less than about 1 mol percent, based on the weight of the diorganopolysiloxanes having condensible terminal groups. If desired, the hydroxyl groups represented in the above formula for diorganopolysiloxanes having terminal condensable groups may be entirely or partially substituted with condensable groups other than Si-bonded hydroxyl groups. Such other condensable groups are alkoxy groups having from 1 to 5 carbon atoms and alkoxyalkyleneoxy groups with from 1 to 5 carbon atoms, such as the methoxyethyleneoxy radical, as well as the hydrolyzable groups which are present in the silicon compounds having at least 3 Si-bonded hydrolyzable groups which are described in detail later. It should be noted that when the terminal condensable groups on the diorganopolysiloxanes are hydrolyzable groups, these hydrolyzable groups need not be identical with the hydrolyzable groups present in the silicon compounds having at least 3 Si-bonded hydrolyzable groups. The silicon compounds having at least 3 Si-bonded hydrolyzable groups are generally referred to as "cross-linking agents."

Examples of hydrocarbon radicals represented by R are alkyl radicals, such as the methyl, ethyl, n-propyl and isopropyl radicals, as well as the octadecyl radical; alkenyl radicals such as the vinyl and the allyl radicals; cycloaliphatic hydrocarbon radicals, such as the cyclopentyl and cyclohexyl radicals, as well as methylcyclohexyl and cyclohexenyl radicals; aryl radicals such as the phenyl and xenyl radicals; aralkyl radicals such as the benzyl, the beta-phenylethyl and the beta-phenylpropyl radicals; as well as alkaryl radicals such as the tolyl radicals.

Substituted hydrocarbon radicals represented by R are preferably halogenated monovalent hydrocarbon radicals, such as the halogenated aryl radicals, for example chlorophenyl and bromophenyl radicals; or cycloalkyl radicals such as the beta-cyanoethyl radical.

Because of their availability, it is preferred that at least 50 percent and, more preferably at least 90 percent of the SiC-bonded radicals on the diorganopolysiloxanes having terminal condensable groups, be methyl radicals.

The diorganopolysiloxanes having terminal condensable groups may be homopolymers or copolymers. Mixtures of various diorganopolysiloxanes having terminal condensable groups may be employed.

It is preferred that the viscosity of the diorganopolysiloxanes having terminal condensable groups be in the range of from 100 to 500,000 mPa at 25° C.

In the preparation of the compositions of this invention it is possible to use the same silicon compounds having at least 3 Si-bonded hydrolyzable groups, which could have been used heretofore in the preparation of compositions which can be stored under anhydrous conditions but which cross-link to form elastomers when exposed to water at room temperature. These compositions are prepared by mixing at least one such silicon compound with diorganopolysiloxanes having terminal condensable groups.

Examples of such silicon compounds containing at least 3 Si-bonded hydrolyzable groups which may be used as cross-linking agents in this invention, are silanes of the formula:

$$R_a SiZ_{4-a},$$

where R is the same as above, Z is a hydrolyzable group and a is 0 or 1, and partial hydrolyzates thereof having from 2 to 10 silicon atoms per molecule.

Examples of hydrolyzable groups represented by Z are acyloxy groups (—OOCR'), hydrocarbonoxy and substituted hydrocarbonoxy groups (—OR'), hydrocarbonoxy-hydrocarbonoxy groups (OR"OR', where R" is a divalent hydrocarbon radical, for example a —CH$_2$—CH$_2$ radical), aminoxy groups (—ONR'$_2$), amino groups (such as —NR'$_2$), acylamino groups (such as —NR'COR'), oxime groups (such as —ON=CR'$_2$) and phosphate groups $$\underset{\underset{O}{\|}}{OP(OR')_2}.$$

In the above formulas, R' represents the same or different, monovalent, or substituted monovalent hydrocarbon radicals; however, one skilled in the art will readily recognize that at least in some of the preceding formulas at least one of the R' radicals can be hydrogen. The examples of hydrocarbon radicals represented by R are equally applicable to the hydrocarbon radicals represented by R' and the examples of substituted hydrocarbon radicals represented by R are equally applicable to the substituted hydrocarbon radicals represented by R'.

Suitable examples of acyloxy groups are those having from 1 to 18 carbon atoms, such as formyloxy, acetoxy, propionyloxy, valeroyloxy, caproloxy, myristyloxy and stearoyloxy groups, with acetoxy being the preferred example.

Examples of hydrocarbonoxy groups are alkoxy groups having from 1 to 10 carbon atoms, for example methoxy, ethoxy, n-propoxy, isopropoxy, butoxy, hexyloxy, heptyloxy and octyloxy groups as well as other hydrocarbonoxy groups having from 1 to 10 carbon atoms, such as vinyloxy, allyloxy, ethylallyloxy, isopropenyloxy, butadienyloxy and phenoxy groups.

An example of a hydrocarbonoxy-hydrocarbonoxy group is the methoxyethyleneoxy group.

Examples of aminoxy groups are dimethylaminoxy, diethylaminoxy, dipropylaminoxy, dibutylaminoxy, dioctylaminoxy, diphenylaminoxy, ethylmethylaminoxy, and methylphenylaminoxy groups.

Examples of amino groups are n-butylamino, sec-butylamino and cyclohexylamino groups.

An example of an acylamino group is the benzoylmethylamino group.

Examples of oxime groups are acetaldoxime, acetophenonoxime, acetonoxime, benzophenonoxime, 2-butanonoxime, diisopropylketoxime, and chlorocyclohexanonoxime groups.

Examples of phosphate groups are dimethylphosphate, diethylphosphate, dibutylphosphate, dioctylphosphate, methylethylphosphate, methylphenylphosphate and diphenylphosphate groups.

The silicon compounds containing at least 3 Si-bonded hydrolyzable groups are preferably used in amounts of from 0.5 to 15 percent by weight, based on the weight of the diorganopolysiloxanes having terminal condensable groups.

The powder obtained from the homopolymerization of acrylonitrile or from the copolymerization of acrylonitrile with at least one other monomer, preferably methacrylic acid ester, in an aqueous medium, can be prepared either by emulsion of suspension polymerization.

Powders obtained from the suspension polymerization are preferred because they contain a maximum of about 1.5 percent by weight of particles having a diameter of more than 200 micron.

It is preferred that the powder obtained from the homopolymerization or copolymerization of acrylonitrile in an aqueous medium, be used in amounts of from 35 to 55 percent by weight, based on the weight of the diorganopolysiloxane having terminal condensable groups.

A preferred copolymer is an acrylonitrile copolymer containing up to 20 percent by weight, based on the total weight of the copolymer, of a methacrylic acid ester.

Examples of methacrylic acid esters are methylmethacrylate, ethylmethacrylate, propylmethacrylate and butylmethacrylate.

In addition to the diorganopolysiloxanes having terminal condensable groups, the silicon compound containing at least 3 Si-bonded hydrolyzable groups and the powder obtained from the acrylonitrile homopolymerization or copolymerization, it is possible to include such other substances as could have been used heretofore in the preparation of compositions which can be stored under anhydrous conditions, but when exposed to moisture at room temperature cross-link to form elastomers. Examples of such additional substances are reinforcing fillers, non-reinforcing fillers, pigments, soluble dyes, scents, organopolysiloxane resins, including those comprising (CH$_3$)SiO$_{\frac{1}{2}}$ and SiO$_{4/2}$ units, purely organic resins other than the powder from a homopolymer or copolymer of acrylonitrile, polyvinylchloride powder, corrosion inhibitors, oxidation inhibitors, heat stabilizers, solvents, additional agents which serve to improve the adhesion of the compositions to the surfaces on which they are applied, for example gamma-glycidoxypropyltriethoxysilane, condensation catalysts, such as tin salts or organo-tin salts of carboxylic acids, for example dibutyltin dilaurate, and plasticizers such as trimethylsiloxy terminated dimethylpolysiloxanes which are fluid at room temperature, or phosphoric acid esters, ultraviolet absorbers and cell-generating substances such as azodicarbonamide.

Examples of reinforcing fillers, i.e. fillers having a surface area of at least 50 m$^2$/g are pyrogenically obtained silicon dioxides, silicic acid hydrogels which have been dehydrated while maintaining their structure, and other types of precipitated silicon dioxide having a surface area of at least 50 m$^2$/g and metal oxides, such as titanium dioxide, ferric oxide, aluminum oxide and zinc oxide, provided the metal oxides have a surface area of at least 50 m²/g.

Examples of non-reinforcing fillers, i.e. fillers having a surface area of less than 50 m²/g, are quartz meal, diatomaceous earth, Neuburg Chalk, calacium silicate, zirconium silicate, calcium carbonate, for example in the form of ground chalk, calcined aluminum silicate and powdered sodium aluminum silicate with molecular sieve properties.

Fibrous fillers such as asbestos and glass fibers, especially those having an average fiber length of no more than 0.5 mm and/or organic fibers may be used as well.

All the previously cited inorganic reinforcing and non-reinforcing fillers may be treated with a hydrophobic agent, for example trimethylethoxysilane or stearic acid to impart hydrophobic properties thereto. If such a treatment is desired, it may be carried out for example, in a ball mill.

Mixtures of various reinforcing and/or non-reinforcing fillers may also be employed.

The ingredients of the compositions of this invention may be mixed in any desired sequence. It is preferred that mixing take place at room temperature and under anhydrous conditions. If desired, mixing may however also take place at elevated temperatures, i.e. at a temperature between 35° and 150° C.

Generally the moisture in the air is sufficient to induce cross-linking of the compositions of this invention. If desired, cross-linking can be carried out at temperatures above room temperature or lower than room temperature, for example at 0° to 10° C. and/or in the presence of an aqueous concentration which exceeds the normal moisture content of the surrounding air.

The compositions of this invention exhibit non-slump properties. Consequnetly they do not run out of vertical or inclined interstices, nor do they run off from vertical or inclined planes before they are cross-linked.

Elastomers obtained from the compositions of this invention adhere especially well to lacquered, varnished and unvarnished wood; oxidized, especially electrolytically oxidized aluminum and untreated aluminum, as well as to glass, when said materials serve as the substrate on which the compositions are applied, and consequently they remain on these substrates even if prior to the application of the compositions the bases are not primed. Therefore, the elastomers thus obtained are especially suited for use in the installation of windows.

The compositions of this invention also adhere extremely well to substrates other than those previously mentioned, for example to enamel, porcelain, crockery and fired clay.

These compositions may also be used as adhesives, putties, coatings and for sealing interstices, including vertical interstices and similar cavities which are from 1 mm to 50 mm in width. They can for example be used to seal land, water or air transportation vehicles, as well as to seal buildings, including those made of lightweight of pre-manufactured components.

When compared with previously known elastomers containing diorganopolysiloxanes having terminal condensable groups and a silicon compound having at least 3 Si-bonded acyloxy groups or amino groups bonded to silicon via nitrogen, the elastomers of this invention have the added advantage that they feel drier and less rubber-like, a feature which can be advantageous in many coating applications. Moreover, the elastomers are far less likely to adhere to substances to which they should not adhere. This feature is especially important when the compositions of this invention are used to seal windows and doors against drafts and noise.

In the following examples, all parts and percentages are by weight unless otherwise specified.

EXAMPLE 1

About 50 parts of a dimethylpolysiloxane having terminal Si-bonded hydroxyl groups and a viscosity of 80,000 mPa at 25° C. and 19 parts of a trimethylsiloxy terminated dimethylpolysiloxane having a viscosity of 100 mPa at 25° C., 6 parts of methyltriacetoxysilane, 20 parts of a powder prepared by suspension polymerizaion in an aqueous medium and consisting of 94 percent of units derived from acrylonitrile and 6 percent of units derived from methacrylic acid methyl ester and containing no more than 1.5 percent by weight of particles having a diameter greater than 200 microns, and 5 parts by weight of a chalk whose surface is coated with 3 percent by weight, based on the weight of the chalk, of stearic acid, are mixed in a planetary type mixer at room temperature and at an absolute pressure of 10 mbar.

The resultant composition is slump-proof and can be stored under anhydrous conditions, but when exposed to atmospheric moisture, cross-links to an elastomer.

COMPARISON EXAMPLE 1

The procedure described in Example 1 is repeated, except that 25 parts of the chalk whose surface is coated with 3 percent by weight of stearic acid, based on the weight of chalk and 5.5 parts of pyrogenically produced silicon dioxide are substituted for the 20 parts of powder obtained from a copolymer of acrylonitrile and methacrylic acid methyl ester and 5 parts of chalk.

COMPARISON EXAMPLE 2

The process described in Example 1 is repeated, except that 20 parts of a polyvinylchloride obtained from an emulsion polymerization, and having an average particle size of from 1 to 2 microns and 6 parts of pyrogenically produced silicon dioxide are substituted for the 20 parts of powder obtained from the copolymerization of an acrylonitrile and methacrylic acid methyl ester.

Samples of compositions prepared in accordance with the Examples were used to prepare an area 10 cm² and 4 mm thick between plates measuring 40 mm×25 mm. The plates consisted of the materials shown in the following Tables. Table 1 shows the results obtained after storing for 3 weeks in atmospheric air at room temperature, while Table II shows the results measured after air storage for 10 days, followed by storage under water for 2 days, then storing for 2 days while exposed to air followed by storage under water for 1 day and finally storing for an additional 2 days in atmospheric air. These samples were all stored at room temperature. Following these tests, the plates were separated from each other at the rate of 5 mm per minute and the required force N/m² was measured. The following Tables show the results obtained.

TABLE I

| | Composition prepared persuant to | | | | | |
| --- | --- | --- | --- | --- | --- | --- |
| | Example 1 | | Comparison Example 1 | | Comparison Example 2 | |
| Plates made of | N/m² | tear | N/m² | tear | N/m² | tear |
| Glass | 70 | K | 60 | K | 45 | K |
| Aluminum | 65 | K | 55 | K | 17 | A |

TABLE I-continued

| | Composition prepared persuant to | | | | | |
|---|---|---|---|---|---|---|
| | Example 1 | | Comparison Example 1 | | Comparison Example 2 | |
| Plates made of | N/m² | tear | N/m² | tear | N/m² | tear |
| Untreated pine | 64 | K | 25 | AK | 38 | A |
| Pine (*) | 66 | K | 35 | AK | 43 | K |
| Pine (**) | 70 | K | 28 | AK | 45 | K |
| Sipo wood, untreated | 65 | K | 36 | AK | 33 | A |
| Sipo wood (*) | 70 | K | 55 | K | 45 | K |
| Sipo wood (**) | 67 | K | 12.5 | A | 44 | K |

(*) Coated with commercial white alkyd resin varnish
(**) Coated with commercially available "Xyladecor" (trademark) colorless varnish.
(***) Not ascertained
A = Adhesion tear (separation between coating and plate)
K = Cohesion tear (tear in coating)
AK = Adhesion and Cohesion tear

TABLE II

| | Composition prepared pursuant to | | | | | |
|---|---|---|---|---|---|---|
| | Example 1 | | Comparison Example 1 | | Comparison Example 2 | |
| Plates made of | N/m² | tear | N/m² | tear | N/m² | tear |
| Pine, untreated | 71 | K | 32 | AK | 29 | A |
| Pine (*) | 61 | K | (***) | — | 27 | AK |
| Pine () | 68 | K | (*) | — | 38 | AK |
| Sipo wood, untreated | 72 | K | 55 | K | 13 | A |
| Sipo wood (*) | 62 | K | (***) | — | 17 | A |
| Sipo wood () | 63 | K | (*) | — | 12 | A |

(*) Coated with commercial white alkyd resin varnish
(**) Coated with commercially available "Xyladecor" (trademark) colorless varnish.
(***) Not ascertained
A = Adhesion tear (separation between coating and plate)
K = Cohesion tear (tear in coating)
AK = Adhesion and Cohesion tear

What is claimed is:

1. A composition which can be stored under anhydrous conditions but which cross-links to form an elastomer when exposed to moisture at room temperature, comprising (1) an organopolysiloxane having terminal condensable groups, (2) a silicon compound having at least 3 Si-bonded hydrolyzable groups per molecule and (3) from 30 to 100 percent by weight based on the weight of the organopolysiloxane (1) of a powder obtained from the polymerization of an acrylonitrile in an aqueous medium.

2. The composition of claim 1, wherein the powder is obtained from the suspension polymerization in an aqueous medium and that said powder contains no more than 1.5 percent by weight of particles having a diameter greater than 200 micron.

3. The composition of claims 1 or 2, where the powder is present in an amount of from 35 to 55 percent by weight, based on the weight of the organopolysiloxane (1).

4. The composition of claims 1 or 2, wherein the powder is obtained from the copolymerization of an acrylonitrile and methacrylic acid ester in an aqueous medium.

5. The composition of claim 4, wherein the copolymer contains up to 20 percent by weight based on the weight of the copolymer of methacrylic acid ester.

* * * * *